(12) United States Patent
Roh et al.

(10) Patent No.: US 11,521,508 B2
(45) Date of Patent: Dec. 6, 2022

(54) PEGBOARD, REHABILITATION TRAINING SYSTEM, AND REHABILITATION TRAINING METHOD

(71) Applicant: NEOFECT CO., LTD., Seongnam-si (KR)

(72) Inventors: Sung Jun Roh, Seoul (KR); Kyung Hwan Yoo, Incheon (KR); Seo Jeong Han, Chungcheongbuk-do (KR)

(73) Assignee: NEOFECT CO., LTD., Seongnam-si (KR)

( * ) Notice: Subject to any disclaimer, the term of this patent is extended or adjusted under 35 U.S.C. 154(b) by 296 days.

(21) Appl. No.: 16/651,122

(22) PCT Filed: Sep. 27, 2018

(86) PCT No.: PCT/KR2018/011433
§ 371 (c)(1),
(2) Date: Mar. 26, 2020

(87) PCT Pub. No.: WO2019/066495
PCT Pub. Date: Apr. 4, 2019

(65) Prior Publication Data
US 2020/0294416 A1    Sep. 17, 2020

(30) Foreign Application Priority Data

Sep. 28, 2017 (KR) .......... 10-2017-0126544
Sep. 27, 2018 (KR) .......... 10-2018-0114836

(51) Int. Cl.
G09B 9/052     (2006.01)
A63F 3/00      (2006.01)
(Continued)

(52) U.S. Cl.
CPC .......... *G09B 9/052* (2013.01); *A63F 3/00574* (2013.01); *A63F 3/00694* (2013.01);
(Continued)

(58) Field of Classification Search
None
See application file for complete search history.

(56) References Cited

U.S. PATENT DOCUMENTS 6,371,931 B1    4/2002  Guillen
2018/0085624 A1 3/2018  Choi et al.

FOREIGN PATENT DOCUMENTS

CN    103041603    4/2013
CN    104997514    10/2015
(Continued)

OTHER PUBLICATIONS

Communication issued in European Application No. 18862153.6, dated Feb. 23, 2022.
(Continued)

*Primary Examiner* — James B Hull
(74) *Attorney, Agent, or Firm* — Hamre, Schumann, Mueller & Larson, P.C.

(57) ABSTRACT

A pegboard of the present disclosure includes: a main device including multiple unit modules; a board plate including multiple receiving portions; and multiple pegs to be inserted into the multiple receiving portions, and the multiple unit modules include multiple sensor modules configured to sense whether the multiple pegs are inserted into the multiple receiving portions and multiple light source modules configured to output light to the multiple receiving portions.

9 Claims, 13 Drawing Sheets

(51) Int. Cl.
  *G09B 1/36* (2006.01)
  *G09B 1/38* (2006.01)
  *G09B 19/00* (2006.01)
  *A63F 9/00* (2006.01)
  *G09B 1/10* (2006.01)

(52) U.S. Cl.
  CPC .............. *G09B 1/36* (2013.01); *G09B 1/38* (2013.01); *G09B 19/00* (2013.01); *A63F 2003/0063* (2013.01); *A63F 2003/00583* (2013.01); *A63F 2009/0003* (2013.01); *G09B 1/10* (2013.01)

(56) References Cited

FOREIGN PATENT DOCUMENTS

| | | |
|---|---|---|
| CN | 105536266 | 5/2016 |
| CN | 105955086 A | 9/2016 |
| EP | 2932896 A2 | 10/2015 |
| JP | 2015202341 A | 11/2015 |
| JP | 2018524055 A | 8/2018 |
| KR | 1020020073920 A | 9/2002 |
| KR | 100806024 B1 | 2/2008 |
| KR | 100832810 B1 | 5/2008 |
| KR | 1020100005645 A | 1/2010 |
| KR | 101005344 B1 | 1/2011 |
| KR | 1020140019566 A | 2/2014 |
| KR | 101386981 B1 | 4/2014 |
| WO | 2017171476 | 10/2017 |

OTHER PUBLICATIONS

International Search Report issued in PCT/KR2018/011433, dated Jan. 2, 2019.

PEGBOARD, REHABILITATION TRAINING SYSTEM, AND REHABILITATION TRAINING METHOD

TECHNICAL FIELD

The present disclosure relates to a pegboard, a rehabilitation training system, and a rehabilitation training method, and more particularly, to a pegboard, a rehabilitation training system, and a rehabilitation training method used for rehabilitation training of stroke patients and the like.

BACKGROUND

In general, a brain-damaged patient, e.g., a stroke patient, requires a tool for gradually recovering the basic perception and exercise functions to return to a normal life.

To this end, conventionally, the patient gets a rehabilitation treatment by using a simple tool, such as a pegboard, and the pegboard is typically designed for the patient to insert multiple blocks into a fixed board to finish a specific pattern or shape.

Meanwhile, in order to provide the most effective treatment method to the patient based on accumulated data while performing a rehabilitation treatment, records and analyses of a process of performing training with a rehabilitation treatment tool, such as a pegboard, and a result of the training process are thoroughly required.

However, conventional pegboards, rehabilitation training systems and rehabilitation training methods are limited in configuration and do not sufficiently consider rehabilitation training methods for brain-damaged patients and thus are not sufficient in developing various senses of the patients.

(Patent Document 1) Korean Patent Laid-open Publication No. 10-2002-0073920 (Sep. 28, 2002)

DISCLOSURE OF THE INVENTION

Problems to be Solved by the Invention

To solve the above-described problem, various embodiments of the present disclosure provide a pegboard, a rehabilitation training system, and a rehabilitation training method configured to be more suitable for rehabilitation training of a brain-damaged patient by allowing the user to recognize a location of a hole (or groove) that outputs a light source and inserting a peg having a shape corresponding to the hole (or groove).

However, problems to be solved by the present disclosure are not limited to the above-described problems. Although not described herein, other problems to be solved by the present disclosure can be clearly understood by a person with ordinary skill in the art from the following description.

Means for Solving the Problems

According to an aspect of the present disclosure, a pegboard includes: a main device including multiple unit modules; a board plate including multiple receiving portions; and multiple pegs to be inserted into the multiple receiving portions, and the multiple unit modules include multiple sensor modules configured to sense whether the multiple pegs are inserted into the multiple receiving portions and multiple light source modules configured to output light to the multiple receiving portions.

Each of the multiple receiving portions is a hole formed in the board plate, and the multiple unit modules are located and fixed outside the multiple receiving portions or biased toward one side and fixed within the multiple receiving portions.

The hole in each of the multiple receiving portions is formed in a vertical direction, and the multiple unit modules are located on a lower side outside the multiple receiving portions or on the lower side inside the multiple receiving portions.

Each of the multiple receiving portions is a groove formed in the board plate, and the multiple unit modules are located and fixed outside the multiple receiving portions or biased toward one side and fixed within the multiple receiving portions.

The groove in each of the multiple receiving portions is concave down in an upper surface of the board plate, and the multiple unit modules are located on a lower side outside the multiple receiving portions or on the lower side inside the multiple receiving portions.

The multiple sensor modules and the multiple light source modules are placed adjacent to each other at the same phase in the vertical direction or stacked in the vertical direction.

The board plate is replaceably coupled to the main device, and the main device further includes a sensing unit that senses the board plate and identifies a type of the board plate.

Each of the multiple light source modules outputs light of a specific color, and the multiple pegs having various sizes or colors include respective magnets different from each other in magnetism.

According to another aspect of the present disclosure, a rehabilitation training system includes: a mobile device; and a pegboard that wireless communicates with the device and determines a training mode, and the pegboard changes at least one of a time point of light output from multiple light source modules, a light output duration, and the number of light source modules that output light simultaneously depending on the training mode.

According to yet another aspect of the present disclosure, a rehabilitation training method using a pegboard including a main device including multiple unit modules and a controller, a board plate including multiple receiving portions, and multiple pegs to be inserted into the multiple receiving portions includes: setting a training mode of the pegboard by the controller; outputting light from the multiple light source modules toward the multiple receiving portions according to the training mode; identifying a receiving portion that outputs light among the multiple receiving portions and inserting at least some of the multiple pegs into at least some of the multiple receiving portions by a user; sensing whether the multiple pegs are inserted into the multiple receiving portions, by the multiple sensor modules; and calculating a training result based on sensing data received from the multiple sensor modules, by the controller.

Effects of the Invention

According to the present disclosure, a user may actively participate in rehabilitation training with fun by inserting pegs having different shapes or sizes into holes (or grooves) from which light is output.

Further, a main device can execute a program by automatically identifying a type of a board plate based on a pattern of magnets in the board plate.

Furthermore, it is possible to provide the user with training in which the user can distinguish pegs based on a difference in intensity between magnets included in the respective pegs and thus identify colors or shapes of the respective pegs.

Moreover, the user can recover brain functions through cognitive training including location memory, sequence memory, and placement relation calculation.

The effects of the present disclosure are not limited to the above-described effects. Although not described herein, other effects of the present disclosure can be clearly understood by a person with ordinary skill in the art from the following description.

BEST MODE FOR CARRYING OUT THE INVENTION

Figure 1:
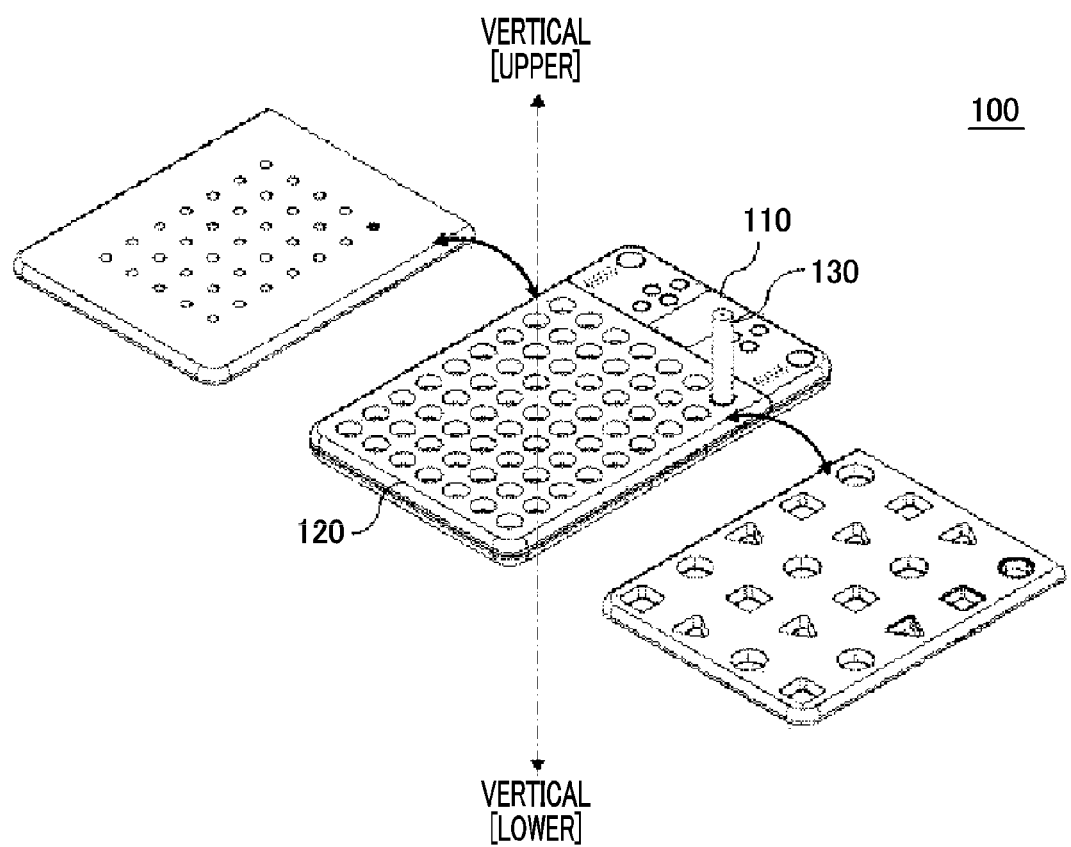
FIG. 1 is a perspective view of a pegboard according to an embodiment of the present disclosure.

The advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person with ordinary skill in the art can fully understand the disclosures of the present disclosure and the scope of the present disclosure. Therefore, the present disclosure will be defined only by the scope of the appended claims.

The terms used herein provided only for illustration of the exemplary embodiments but not intended to limit the present disclosure. As used herein, the singular terms include the plural reference unless the context clearly indicates otherwise. The terms "comprises" and/or "comprising" specify the presence of stated components, but do not preclude the presence or addition of one or more other components, and the term "and/or" includes any and all combinations of one or more of the associated listed items. Throughout the whole specification, the same reference numerals denote the same elements, and the term "and/or" includes any and all combinations of one or more of the associated listed items. Although the terms "first", "second", and the like are used for describing various components, these components are not confined by these terms. These terms are merely used for distinguishing one component from the other components. Therefore, a first component to be mentioned below may be a second component in a technical concept of the present disclosure.

Unless otherwise defined, all terms (including technical and scientific terms) used herein have the same meaning as commonly understood by a person with ordinary skill in the art to which this invention pertains. It will be further understood that terms, such as those defined in commonly used dictionaries, should not be interpreted in an idealized or overly formal sense unless expressly so defined herein.

The spatially-relative terms such as "below", "beneath", "lower", "above", "upper", etc. may be used herein for ease of description to describe the relationship of one component with another component(s) as illustrated in the drawings. It will be understood that the spatially relative terms are intended to encompass different orientations of the component in use or operation, in addition to the orientation depicted in the drawings. For example, if the component in the drawings is turned over, components described as "below" or "beneath" other components would then be oriented "above" the other components. Thus, the exemplary term "below" can encompass both an orientation of above and below. The component may be otherwise oriented in another direction and the spatially-relative terms used herein interpreted accordingly.

In the following, the term "vertical direction" may refer to the direction in which a vertical axis illustrated in FIG. 1 is formed. Further, one side of the "vertical direction" may refer to a "lower side" and the other side of the "vertical direction" may refer to an "upper side".

Hereafter, a pegboard 100 of the present disclosure will be described in detail with reference to the accompanying drawings. FIG. 1 is a perspective view of the pegboard 100 according to an embodiment of the present disclosure, and FIG. 2 is an exploded view of the pegboard 100 according to an embodiment of the present disclosure.

Figure 2:
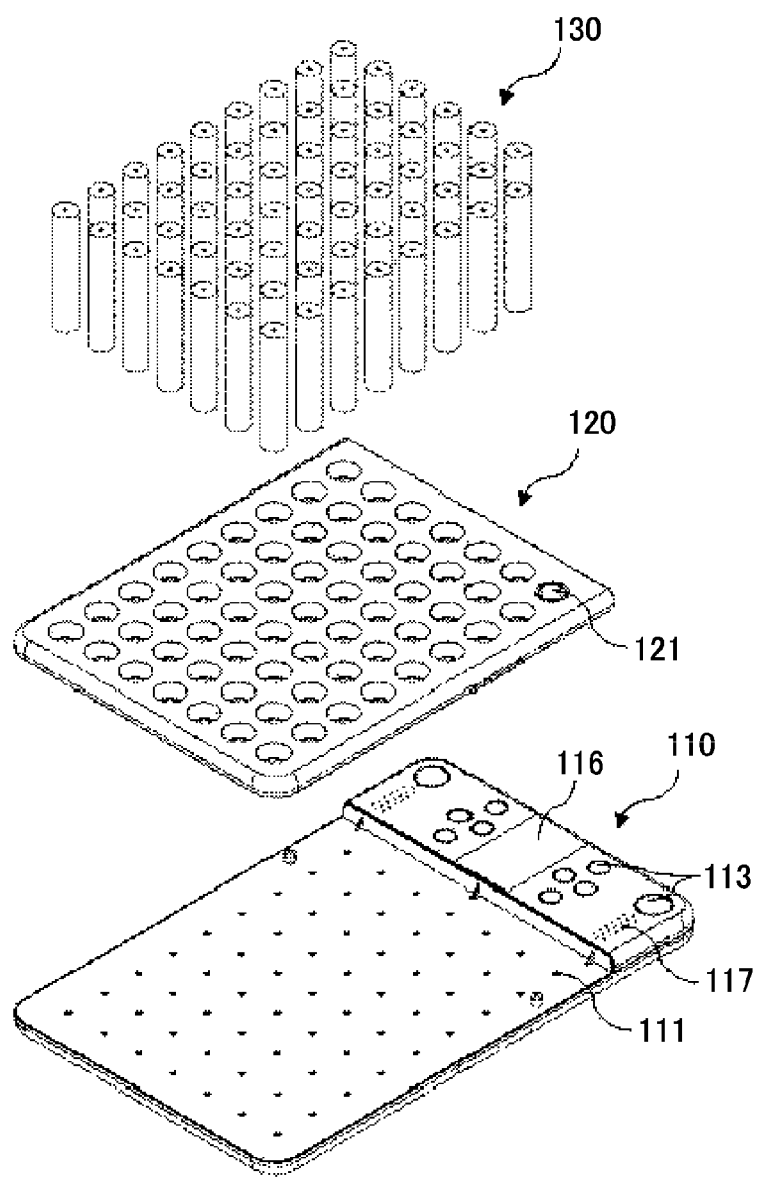
FIG. 2 is an exploded view of the pegboard according to an embodiment of the present disclosure.

Referring to FIG. 1 and FIG. 2, the pegboard 100 according to an embodiment of the present disclosure includes a main device 110, a board plate 120, and multiple pegs 130.

In the main device 110, multiple unit modules 111 are placed on a plane at a specific distance. The multiple unit modules 111 include multiple sensor modules configured to sense whether the multiple pegs 130 are inserted into multiple receiving portions 121 of the board plate 120 and multiple light source modules configured to output light to the multiple receiving portions 121.

In this case, the multiple unit modules 111 may be in one-to-one correspondence with the multiple receiving portions 121 of the board plate 120, and each of the multiple unit modules 111 may include a sensor module and a light source module, but is not limited thereto. That is, each unit module 111 may include two or more sensor modules and two or more light source modules, or a sensor module and a light source module may cover two or more unit modules 111 to sense the insertion of at least some of the multiple pegs 130 into the two or more unit modules 111 and output light to the outside of the two or more unit modules 111.

Further, each peg 130 is inserted into a single receiving portion 121, but the present disclosure is not limited thereto. That is, the multiple pegs 130 may be inserted into a single receiving portion 121 (not illustrated). Hereafter, the pegboard 100 of the present disclosure will be described with reference to an example where each peg 130 is inserted into a single receiving portion 121.

In another embodiment of the present disclosure, the sensor module and the light source module may be placed adjacent to each other at the same phase in a vertical direction or stacked in the vertical direction (in contact with each other or at a distance from each other). For example, if the sensor module and the light source module are stacked in the vertical direction, the sensor module and the light source module may be located on top and bottom sides, respectively. On the contrary, the sensor module and the light source module may be located on bottom and top sides, respectively. Therefore, the multiple unit modules 111 may be spaced apart from each other at a specific distance and also be integrated depending on the area and the height (design conditions) of the main device 110.

In another embodiment of the present disclosure, the multiple light source modules may be configured as LEDs that output light of multiple colors. Thus, light of multiple colors can be seen sequentially or simultaneously through the multiple receiving portions 121 of the board plate 120 from the outside.

In an embodiment of the present disclosure, the multiple unit modules 111 may be placed in the form of a lattice on a plane of the main device 110 at a specific distance. Further, the shape and size of the multiple receiving portions 121 in the board plate 120 are not limited as long as light output from the light source modules can be seen through the receiving portions 121 of the board plate 120 from the outside when the board plate 120 is inserted into the main device 110.

Meanwhile, the multiple unit modules 111 may be placed within a case of the main device 110 or exposed to the outside through multiple holes formed on an upper surface of the case of the main device 111. In this case, the multiple unit modules 111 may be coated with a waterproof material to suppress damage to the multiple unit modules 111 by the external environment (e.g., damage caused by submersion, degradation, etc.).

Moreover, in a modification example (not illustrated) of the present disclosure, a separate plate is provided the an upper surface of the case of the main device 110 to maintain airtightness within the main device 110. In this case, the plate may be formed of a waterproof material including synthetic resin such as silicone and placed between the main device 110 and the board plate 120.

Further, when the board plate 120 is coupled to the main device 110, the multiple unit modules 111 may be in one-to-one correspondence with the multiple receiving portions 121 of the board plate 120 and may have a size to be overlapped in the vertical direction.

In another embodiment of the present disclosure, each of the multiple sensor modules may be a hall-sensor. For example, if a magnet is included within or on one side of each of the multiple pegs 130, when one of the multiple pegs 130 is inserted into one of the multiple receiving portions 121, the magnet of the peg 130 approaches a sensor module (hall-sensor) of the unit module 111 corresponding to the receiving portion 121 into which the peg 130 is being inserted and the sensor module (hall-sensor) generates an output signal. Thus, it is possible to sense that the peg 130 is being inserted into the receiving portion 121.

That is, each of the multiple sensor modules can sense magnetism of the peg 130 being inserted among the multiple pegs 130. In this case, the term "magnetism" may include the intensity, direction, and pattern of magnetic fields of the peg 130 being inserted among the multiple pegs 130.

However, the present disclosure is not limited thereto. Each of the multiple sensor modules may be an infrared ray sensor, a photo sensor, a light sensor, a pressure sensor, or the like. That is, a type of each sensor module is not limited as long as the sensor module can detect whether the multiple pegs 130 are inserted.

The board plate 120 may be replaceably inserted or coupled to the main device 110 and may include the multiple receiving portions 121 and magnets 122. The multiple receiving portions 121 may have the same shape or different shapes. For example, the multiple receiving portions 121 may have the same shape in the same size, the same shape in different sizes, or different shapes in different sizes.

Figure 3A:
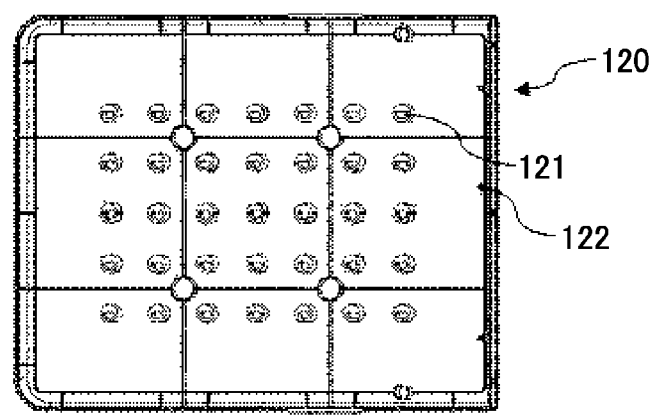
FIG. 3 is provided to explain a board plate according to an embodiment of the present disclosure.
Figure 3B:
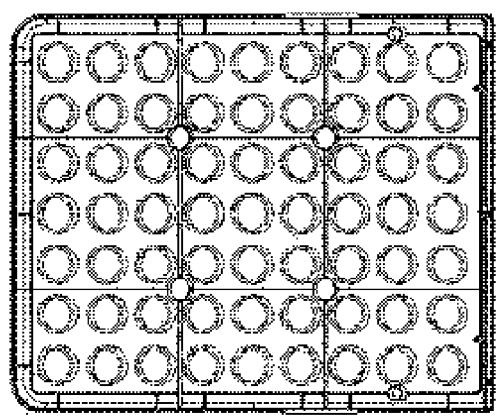
Figure 3C:
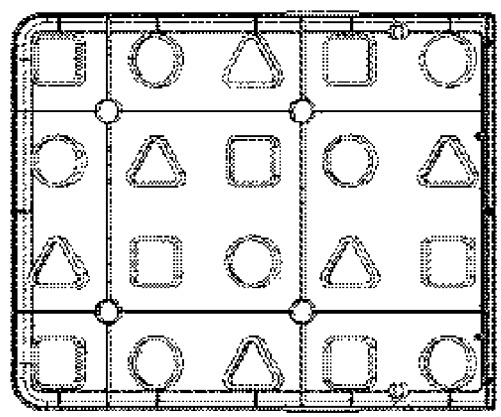

FIG. 3 is provided to explain the board plate 120 according to an embodiment of the present disclosure. As shown in FIG. 3, the multiple receiving portions 121 may the same shape in different sizes depending on a type of the board plate 120 (see FIG. 3A and FIG. 3B). Also, the multiple receiving portions 121 may different shapes in different sizes depending on a type of the board plate 120 (see FIG. 3A and FIG. 3C). Therefore, a user can increase or decrease the level of difficulty by replacing the board plate 120.

In another embodiment of the present disclosure, the main device 110 may include a sensing unit 118 placed on one side of the main device 110 where the main device 110 is brought into contact with the board plate 120 when they are coupled to each other. In this case, the sensing unit 118 may be composed of multiple hall-sensors. Therefore, the sensing unit 118 may sense magnetism of the board plate 120 and identify a type of the board plate 120. In this case, the term "magnetism" may include the intensity, direction, and pattern of magnetic fields of the board plate 120 being coupled to the main device 110 among the multiple board plate 120.

To this end, the board plate 120 may include the magnets 122 located corresponding to the sensing unit 118 of the main device 110, and the board plates 120 may be different from each other in number and pattern of the magnets 122. That is, the board plate 120 may include multiple magnets 122, and there may be multiple sensing units 118 accordingly (for example, the sensing units of the main device may be in one-to-one correspondence with the magnets of the board plate).

Accordingly, the sensing units 118 of the main device 110 can identify a type of the board plate 120 coupled to the main device 110 based on magnetism of the multiple magnets 122 of the board plate 120. A program is previously stored in the main device 110 according to the magnetism of the multiple magnets 122. Thus, when the board plate 120 is coupled to the main device 110, a program corresponding to the board plate 120 can be executed just by coupling the board plate 120 to the main device 110 without any setting or control.

In another embodiment of the present disclosure, if the board plate 120 coupled to the main device 110 is composed of multiple divided board plates, the sensing unit 118 may be located on one side of the main device 110 where the main device 110 is brought into contact with the divided board plates 120 when they are coupled to each other, as described above. Even in this case, the sensing unit 118 may be composed of multiple hall-sensors.

If the multiple divided board plates are coupled to the main device 110, the main device 110 may individually identify the divided board plates having the same or different magnetism formed by the multiple magnets 122 of the board plate 120. The divided board plates can be identified individually in the same manner as a single board plate is coupled. A program is previously stored in the main device 110 according to a pattern of the multiple magnets 122 of the board plate 120. Thus, when the multiple divided board plates are coupled to the main device 110, a program corresponding to the multiple divided board plates can be executed just by coupling the multiple divided board plates to the main device 110 without any setting or control.

Meanwhile, the board plate 120 may be formed of at least a light diffusion material. Therefore, the user can see light output from the multiple light source modules through the multiple receiving portions 121 of the board plate 120 from the outside.

In this case, the optical diffusion material may include any one or more of light diffusion acryl for lighting, light diffusion acryl, or light diffusion polycarbonate (PC).

Meanwhile, a separate light diffusion cylinder formed of the above-described materials may be provided in each of the multiple receiving portions 121. In this case, when light is output to the outside, the luminance is improved, and, thus, light can be well diffused to the outside. Therefore, the light source modules provided in the main device 110 may output light to the board plate 120 to guide the user where the multiple pegs 130 will be inserted.

Further, the multiple unit modules 111 are provided in the main device 110. Therefore, if the board plate 120 is manufactured to overlap the multiple unit modules 111 and the multiple receiving portions 121 corresponding to each other in the vertical direction, various board plates 120 can be replaced and used without replacing the main device 110. Accordingly, rehabilitation training can be performed using various types of games at low cost.

Meanwhile, each of the multiple receiving portions 121 may be manufactured to have a large cross-sectional area perpendicular to the vertical direction, and multiple LEDs (elements of the light source module) may be placed in each receiving portion 121 with a large area. In this case, the multiple LEDs can be batch controlled at the same time when a peg 130 being inserted into a hall-sensor (an element of the sensor module) corresponding to a receiving portion 121 is sensed.

The multiple pegs 130 have shapes suitable for being inserted into the respective multiple receiving portions 121 of the board plate 120. The user (e.g., a patient under rehabilitation) may grip each of the multiple pegs 130 with a hand and thus insert one of the multiple pegs 130 into a target receiving portion 121 among the multiple receiving portions 121 of the board plate 120.

The multiple pegs 130 may have various sizes, colors, or shapes. Therefore, the user can achieve different effects of training from various sizes, colors, or shapes of the multiple pegs 130.

For example, if some of the multiple pegs 130 include asymmetric insertion portions and have smaller sizes than the other pegs 130, the user who performs insertion training using the pegs 130 may feel a high level of difficulty. In this case, the user may replace the board plate 120 including the multiple receiving portions 121 corresponding to the pegs 130 and continue the training.

Accordingly, the user can perform training with a suitable level of difficulty for the user's condition. Also, the user can perform training of inserting the pegs 130 having different sizes, colors, or shapes into the receiving portions 121 according to commands of the main device 110. In this case, the main device 110 may distinguish the pegs 130 having various sizes, colors, or shapes.

In order for the main device 110 to distinguish the pegs 130 having various sizes or colors, magnets different from each other in magnetism are provided for the respective pegs 130 having various sizes or colors. Since the pegs 130 of the same type with the same size or color include magnets having the same magnetism, the sensor modules included in the main device 110 can sense the magnetism and thus identify a type of the pegs 130. The identified type of the pegs 130 may be fed back to the user during rehabilitation training.

In another embodiment of the present disclosure according to the main device 110, the multiple pegs 130 may have the same long cross-sectional shape, and each may include a grip portion (to be gripped by the user) and an insertion portion (to be inserted into a receiving portion).

The rehabilitation training system according to an embodiment of the present disclosure may further include a finger wearable device (not illustrated) in addition to the pegboard 100.

The finger wearable device may include any device that can be worn on fingers, such as gloves or rings. In this case, each of the multiple pegs 130 may include a communication module.

Therefore, the finger wearable device and the multiple pegs 130 can exchange information through the communication modules included in the respective multiple pegs 130. In this case, information can be transmitted and received by wireless communication.

The wireless communication may include, e.g., near field communication (NFC) or radio frequency identification (RFID) for communication within a short distance and Bluetooth, Bluetooth low energy (BLE), Beacon, infrared data association (IrDA), ultra-wideband (UWB), or ZigBee for communication within a short range.

It is possible to identify a type of a peg 130 gripped by the user through communication between the finger wearable device and the multiple pegs 130. Also, if the user selects a wrong peg 130, the user may receive feedback when the user grips the peg 130 before inserting the peg 130 into the board plate 120.

Meanwhile, at least a part of the finger wearable device instead of the multiple receiving portions 121 may be inserted into the multiple receiving portions 121. In this case, the finger wearable device for left hand and the finger wearable device for right hand may include magnets different from each other in magnetism, and the multiple sensing modules of the multiple unit modules 111 may distinguish the magnetism of the finger wearable device for left hand from the magnetism of the finger wearable device for right hand and thus identify whether the wearer inserts the left hand or the right hand. In this case, the term "magnetism" may include the intensity, direction, and pattern of magnetic fields as described above.

FIG. 4 conceptually illustrates the shape of a receiving portion and the location of a unit module according to various embodiments of the present disclosure. As shown in FIG. 4, each of the multiple receiving portions 121 may be a hole (see FIG. 4A and FIG. 4B) or a hole (see FIG. 4C and FIG. 4D) formed in the board plate 120. In this case, each of the multiple unit modules 111 may be located outside a corresponding receiving portion 121 among the multiple receiving portions 121 (see FIG. 4A and FIG. 4C) or biased toward one side within the corresponding receiving portion 121 among the multiple receiving portions 121 (see FIG. 4B and FIG. 4D).

Figure 4A:
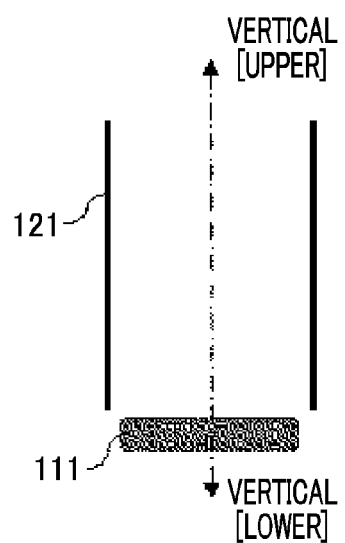
FIG. 4 conceptually illustrates the shape of a receiving portion and the location of a unit module according to various embodiments of the present disclosure.
Figure 4B:
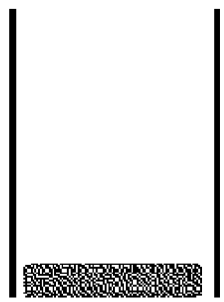
Figure 4C:
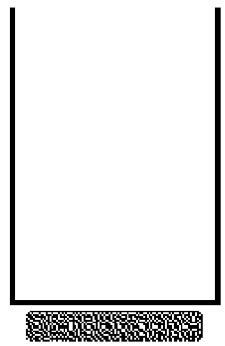

Specifically, the hole in each of the multiple receiving portions 121 may be formed in the vertical direction (i.e., extended from top to bottom), and the multiple unit modules 111 may be located on a lower side outside the respective multiple receiving portions 121 (see FIG. 4A) or on the lower side inside the respective multiple receiving portions 121 (see FIG. 4B).

Figure 4D:
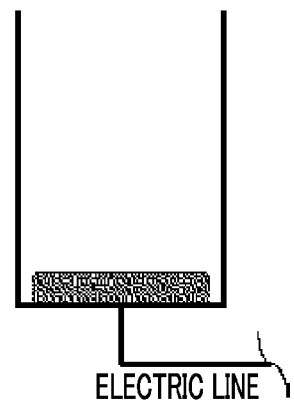

Further, a groove in each of the multiple receiving portions 121 may be concave down in an upper surface of the board plate 120, and the multiple unit modules 111 may be located on a lower side outside the respective multiple receiving portions 121 (see FIG. 4C) or on the lower side inside the respective multiple receiving portions 121 (see FIG. 4D).

Meanwhile, when the multiple unit modules 111 are located inside the respective multiple receiving portions 121, the multiple unit modules 111 may be electrically connected to a controller 112 by electric wires passing through bottom surfaces of the respective multiple receiving portions 121.

Further, each of the multiple unit modules 111 is a stator and may be placed in a fixed state. Further, the light source module in each of the multiple unit modules 111 may be located inside a corresponding receiving portion 121 among the multiple receiving portions 121 and the sensor module may be located outside the corresponding receiving portion 121 among the multiple receiving portions 121 (and vice versa, i.e., the light source module outside the receiving portion and the sensor module inside the receiving portion).

In the pegboard 100 according to various embodiments of the present disclosure, the multiple receiving portions 121 have sufficient space for the respective multiple pegs 130 to be inserted deep into the lower side, and lower surfaces of the multiple pegs 130 are placed facing the sensor modules of the multiple unit modules 111 in close proximity to each other. Thus, it is possible to improve the accuracy of sensing.

Figure 5:
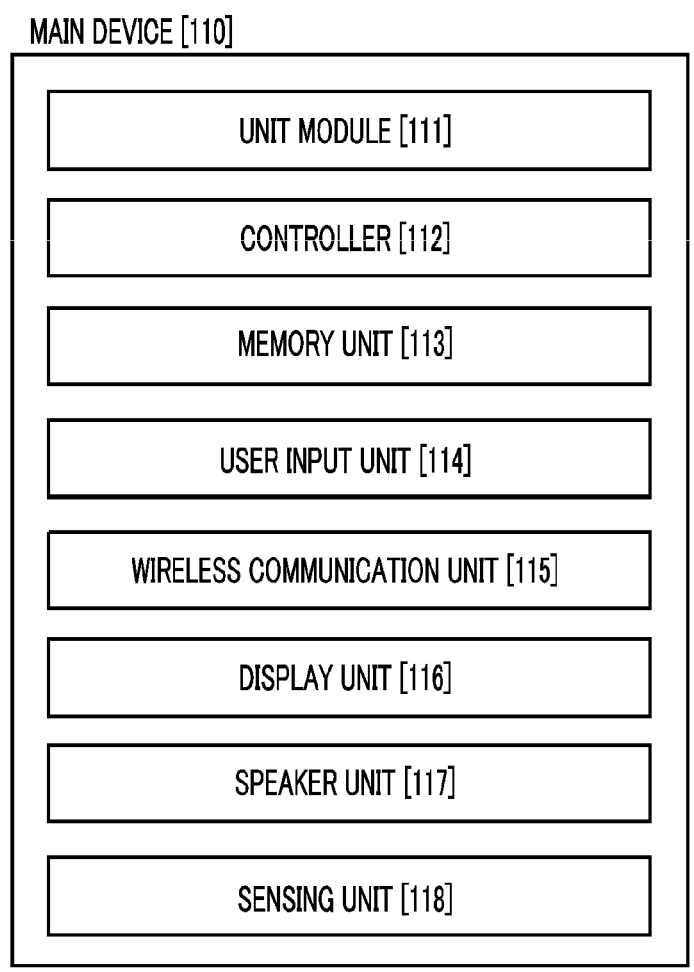
FIG. 5 is a block diagram illustrating the configuration of a main device according to an embodiment of the present disclosure.

FIG. 5 is a block diagram illustrating the configuration of the main device 110 according to an embodiment of the present disclosure. As shown in FIG. 5, the main device 110 includes the multiple unit modules 111, the controller 112, a memory unit 113, a user input unit 114, a wireless communication unit 115, a display unit 116, a speaker unit 117, and the sensing unit 118.

The controller 112 may be provided within the main device 110. If the controller 112 is provided within the main device 110, the user may input information related to a training mode by using the user input unit 114 provided in the main device 110. The training mode refers to the type of a game, the level of difficulty of the game, and conditions (e.g., a time point of light output, a light output duration, and the number of light source modules that output light simultaneously) for outputting light by the light source modules, and the user may perform training that is suitable for the patient's condition by inputting information related to the training mode.

The rehabilitation training system according to an embodiment of the present disclosure may further include a mobile device (not illustrated) of the user in addition to the pegboard 100. In this case, the training mode may be determined through wireless communication between the pegboard 100 and the user's mobile device. The controller 112 may be included in the user's mobile device (not illustrated).

For example, an application interworking with the main device 110 is installed in the mobile device. Therefore, the user may transmit, to the main device 110, information related to a training mode set in the application by short range wireless communication.

The main device 110 may further include the wireless communication unit 115 for receiving information related to the training mode, and the short range communication may include, e.g., Bluetooth, Bluetooth low energy (BLE), Beacon, radio frequency identification (RFID), near field communication (NFC), infrared data association (IrDA), ultra-wideband (UWB), and ZigBee.

In another embodiment of the present disclosure, the user may adjust the speed at which the light source modules output light or adjust the time required for the sensor modules to recognize the pegs 130 being inserted into the multiple receiving portions 121 by using the user input unit 114 of the main device 110 or the user's mobile device and thus adjust the level of difficulty of training.

In yet another embodiment of the present disclosure, a rehabilitation training system 100 may include multiple controllers. For example, a first controller may be provided within the main device 110 and a second controller may be configured as an application installed in the mobile device.

Therefore, the first controller and the second controller may perform the functions that have been performed by an existing controller in an associated or distributed manner. For example, when the first controller and the second controller perform the functions that have been performed by the existing controller in an associated manner, the first controller within the main device 110 may function to convert data transmitted by the application into a format suitable to be provided to the unit modules 111. Further, for example, when the first controller and the second controller perform the functions that have been performed by the existing controller in a distributed manner, the first controller may function to set light output conditions of the light source modules and the second controller may function to calculate a training result based on data sensed by the sensor modules.

Schematically, the user (e.g., the patient who requires rehabilitation training) may identify a receiving portion 121 that outputs light among the multiple receiving portions 121 and recognize the shape or size of the receiving portion that outputs light to the outside. Then, the user may perform rehabilitation training by selecting a peg 130 corresponding to the receiving portion 121 that outputs light among the multiple pegs 130 and inserting the peg 130 into the receiving portion 121 that outputs light to the outside.

The rehabilitation training may include exercise training for the user to insert a peg 130 into a location indicated by an LED of a light source module and cognitive training for the user to insert the peg 130 based on the user's judgement.

The cognitive training may include location memory training, sequence memory training, and placement relation calculation training.

In the location memory training, the locations of some of the multiple receiving portions 121 are shown by outputting light from the LEDs of the light source modules and then, when the LEDs of the light source modules are turned oft the user is supposed to memorize the receiving portions 121 through which light has been output and insert the pegs 130 into the receiving portions 121 through which light has been output.

In the sequence memory training, light is output from the LEDs of the light source module in a predetermined sequence and then, when the LEDs of the light source modules are turned off, the user is supposed to memorize the sequence of receiving portions 121 through which light has been output among the receiving portions 121 and insert the pegs 130 according to the sequence.

The placement relation calculation training can be performed by carrying out commands of the device. The commands of the device may include, e.g., a command for inserting the pegs 130 into three receiving portions 121 through which light is output from the LEDs of the light source modules so as to be placed in a straight line.

However, the commands of the device is not limited to this example and may include any command that can change the placement relation.

The user can recover brain functions more quickly by performing the above-described cognitive training than by performing exercise training only.

Further, in another embodiment, the rehabilitation training system further includes a controller. The controller is configured to determine an evaluation condition for calculating a training result based on the light output conditions of the light source modules and sensing data received from the sensor modules.

Figure 6:
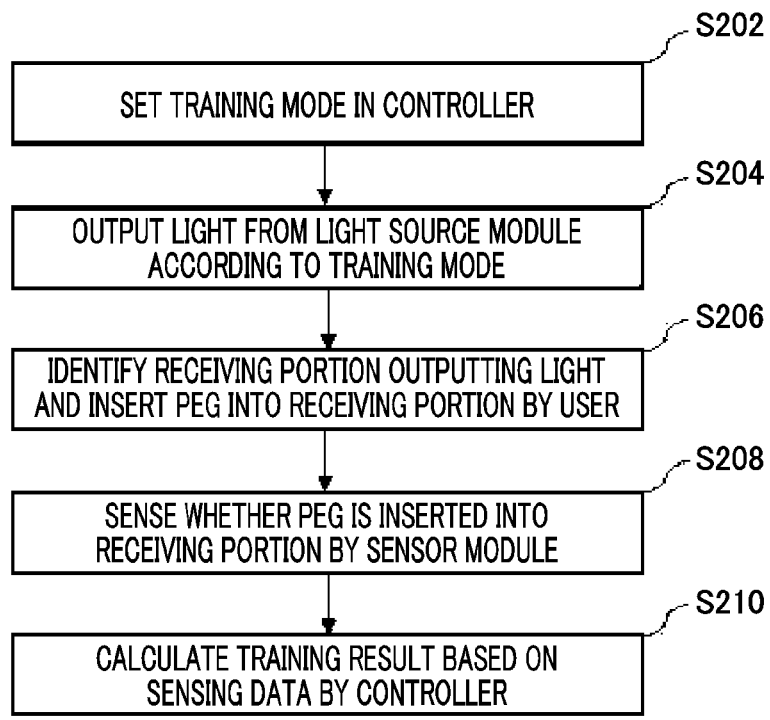
FIG. 6 is provided to schematically explain a method of performing rehabilitation training using a board plate and pegs by a user according to an embodiment of the present disclosure.

FIG. 6 is a flowchart showing a process of performing rehabilitation training by a user according to an embodiment of the present disclosure.

First, in operation S202, the user may select a training mode suitable for rehabilitation training. In this case, the training mode selected by the user may be set in the controller 112.

In operation S204, the multiple light source modules included in the unit modules 111 may output light to the multiple receiving portions 121 according to the training mode.

In operation S206, the user may identify receiving portions 121 that output light among the multiple receiving portions 121 and insert at least some of the multiple pegs 130 into at least some of the multiple receiving portions 121. In this case, the user may select the pegs 130 corresponding to the receiving portions 121 that output light among the multiple pegs 130 and then insert the selected pegs 130.

In operation S208, the multiple sensor modules may sense whether the multiple pegs 130 are inserted into the multiple receiving portions 121. In this case, the multiple sensor modules may generate sensing data thereon.

In yet another embodiment of the present disclosure, when training is started, the controller 112 may determine whether sensing data can be received from each of the unit modules and request the removal of the peg 130 from the user. That is, training cannot be performed properly if the peg 130 is inserted when the training is initially started, the controller 112 may request, from the user, the removal of the peg 130 from a specific receiving portion 121 from which the sensing data are received. The request for removal may be visually provided to the user through the display unit 116 of the main device 110 or a screen of the mobile device. Also, the request for removal of the peg 130 may be provided to the user through the speaker unit 117 of the main device 110 or a voice output unit of the mobile device.

In yet another embodiment of the present disclosure, the controller 112 may control light source modules around the non-removed peg 130 to output light and thus provide the user with the request for the removal of the peg 130.

In operation S210, the controller 112 may calculate a training result based on the sensing data received from the multiple sensing modules. In an embodiment of the present disclosure, the controller may calculate the time that is consumed to insert a peg 130 after a light source module at a specific location outputs light, and may apply the time to the evaluation condition.

For example, when a mole game is performed by using the rehabilitation training system, the controller may detect the time during which the sensor modules sense the pegs 130 after the light source module output light, and then determine whether an operation required in the game is successful.

In another embodiment of the present disclosure, when the application of the mobile device corresponds to the controller 112, the controller 112 may receive sensing data from the main device 110 and evaluate a training result by applying the evaluation condition according to the training mode.

In another embodiment of the present disclosure, the main device 110 may further include the memory unit 113. The memory unit 113 may record location information matched with the shape of the multiple receiving portions 121 of the board plate 120 and difficulty level information corresponding to the shape. Thus, when the user sets a training mode, light suitable for the training mode can be output through the multiple receiving portions 121.

In yet another embodiment of the present disclosure, the main device 110 may further include the display unit 116. The display unit 116 may provide the user with a user interface for setting at least one of a training mode, a level of difficulty, a type of a game, a type of pegs, and a type of a board plate. Accordingly, the controller 112 may set an evaluation condition for calculating light output conditions of the multiple light source modules and a training result based on the user's input data received through the user interface.

Further, the input data of the user may be input through the user input unit 113 of the main device 110, or may be directly input through the display unit 116 when the display unit 116 is a touchscreen. In yet another embodiment of the present disclosure, the user interface provided by the display unit 116 may be displayed on a screen of the mobile device of the user in an associated manner.

In yet another embodiment of the present disclosure, the controller 112 may control the output of the multiple light source modules to implement various types of games for the users. Accordingly, the users may actively participate in the rehabilitation training with fun. Thus, the effect of treatment may be improved. For example, the controller 112 may request the output of light from multiple selected unit modules, and if all of the multiple selected unit modules sense the pegs 130, the controller 112 may determine that the training is achieved.

Figure 7:
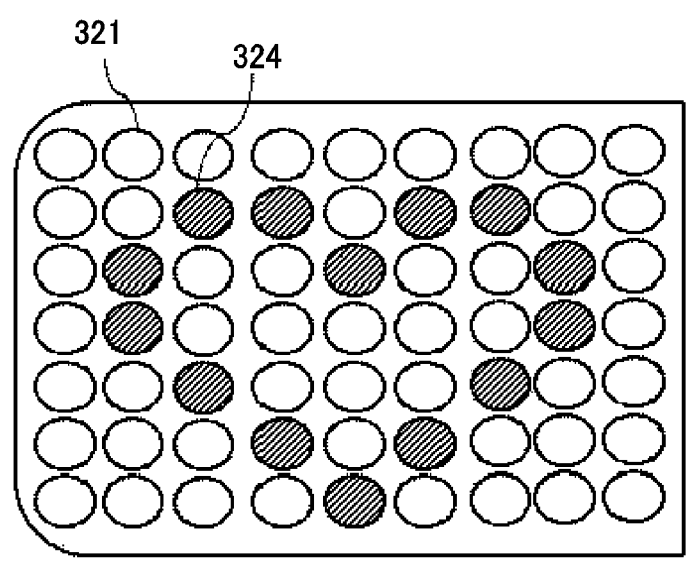
FIG. 7 schematically illustrates that multiple selected unit modules output light according to another embodiment of the present disclosure.

Referring to FIG. 7, the controller may request the output of light from the unit modules 117 located in hatched receiving portions 324 among multiple receiving portions 322 of a board plate. Accordingly, the user may identify light output to the outside of the hatched receiving portions 324 and thus visually identify a heart shape formed by the output light. The heart shape has been described as an example of the shape for convenience of description. The controller 112 may control the multiple unit modules 117 to form various shapes. Then, the controller 112 may calculate the time that is consumed by the user to insert the pegs 130 into all the receiving portions 324 constituting the heart shape and then reflect the calculated time on the training result.

Figure 8:
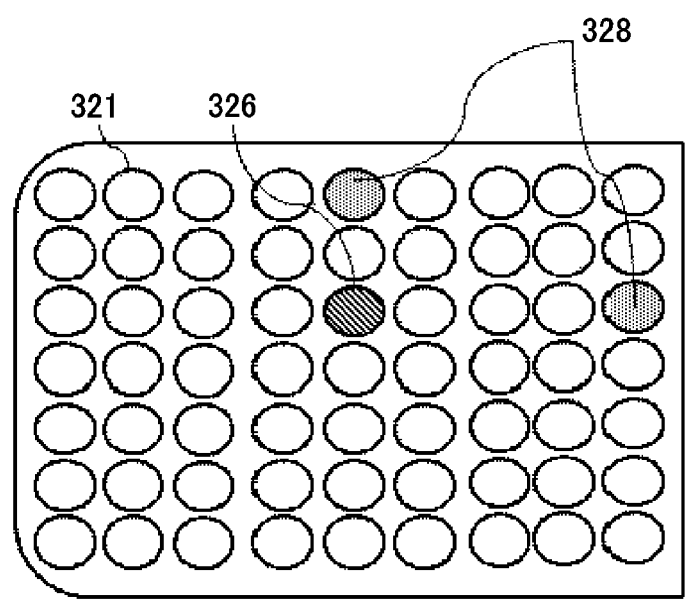
FIG. 8 schematically illustrates that unit modules output light to provide a hint to a user according to yet another embodiment of the present disclosure.

In yet another embodiment of the present disclosure, referring to FIG. 8, the user may memorize the locations of receiving portions 326 outputting light, and when the light is turned off, the user may perform training of inserting the pegs 130 into the locations. In yet another embodiment of the present disclosure, when not memorizing the locations of the receiving portions 326 outputting light, the user may request the provision of a hint from the controller 112 by using the user input unit 114 of the main device 110 or the mobile device of the user. When receiving a request for the provision of a hint from the user, the controller 112 operates light source modules located in receiving portions 328 having been related to memory training among the receiving portions 326 on the outermost side of a board plate 320. In yet another embodiment of the present disclosure, the controller may provide only one of column information or row information to the receiving portions 328 having been related to the memory training according to the level of difficulty set by the user.

In yet another embodiment of the present disclosure (not illustrated), when the controller 112 sequentially turns on or off the output from multiple light source modules, the user visually feels as if receiving portions that output light moved. Therefore, the user may perform training of inserting pegs into receiving portions, from which the output of light is predicted, by predicting the movement of the receiving portions that output light. For example, when the controller 112 sequentially controls the output of four light source modules at the initial stage, if the user accurately inserts a peg into a hole from which the output of light is predicted, the controller 112 sequentially controls the output of the three light source modules. That is, whenever the user inserts a peg into an accurately predicted point, the number of light source modules that output light simultaneously may be decreased.

In yet another embodiment of the present disclosure, the controller 112 may set a time limit according to the training mode, the level of difficulty, the type of the game, the type of the pegs, and the type of the board plate, and provide information related to the time limit to the user through the display unit 116 of the main device 110 or the screen of the mobile device. In another embodiment of the present disclosure, the information related to the time limit may be delivered to the user through the speaker unit 117 of the main device 110 or a voice output unit of the mobile device.

The steps of a method or algorithm described in connection with the embodiments disclosed herein may be embodied directly in hardware, in a software module executed by hardware, or in a combination of the two. The software module may reside in RAM (Random Access Memory), ROM (Read Only Memory), EPROM (Erasable Programmable ROM), EEPROM (Electrically Erasable Programmable ROM), flash memory, hard disk, a removable disk, a CD-ROM, or any other form of computer-readable storage medium known in the art.

Although the exemplary embodiments of the present disclosure have been described with reference to the accompanying drawings, it would be understood by a person with ordinary skill in the art that various changes and modifications may be made without changing technical conception and essential features of the present disclosure. Thus, it should be understood that the above-described embodiments are illustrative in all aspects and do not limit the present disclosure.

EXPLANATION OF REFERENCE NUMERALS

100: Pegboard
110: Main device
111: Unit module
112: Controller
113: Memory unit
114: User input unit
115: Wireless communication unit
116: Display unit
117: Speaker unit
118: Sensing unit
120: Board plate
121, 321: Receiving portion
122: Magnet
130: Peg
324: Hatched receiving portion
326: Receiving portion outputting light for memory training
328: Receiving portion having been related to memory training (providing a hint)

We claim:

1. A pegboard, comprising:
a main device including multiple unit modules;
a board plate including multiple receiving portions,
wherein the board plate is replaceably coupled to the main device; and
multiple pegs to be inserted into the multiple receiving portions,
wherein the multiple unit modules include multiple sensor modules configured to sense whether the multiple pegs are inserted into the multiple receiving portions and multiple light source modules configured to output light to the multiple receiving portions, and
wherein the main device further includes a sensing unit configured to sense the board plate and identify a type of the board plate based on a pattern of magnets in the board plate.

2. The pegboard of claim 1, wherein each of the multiple receiving portions is a hole formed in the board plate, and the multiple unit modules are located and fixed on a lower side of the multiple receiving portions.

3. The pegboard of claim 2, wherein
the hole in each of the multiple receiving portions is formed in a vertical direction, and
the multiple unit modules are located on a lower side outside the multiple receiving portions or on the lower side inside the multiple receiving portions.

4. The pegboard of claim 1, wherein each of the multiple receiving portions is a groove formed in the board plate, and the multiple unit modules are located and fixed on a lower side of the multiple receiving portions.

5. The pegboard of claim 4, wherein
the groove in each of the multiple receiving portions is concave down in an upper surface of the board plate, and
the multiple unit modules are located on the lower side outside the multiple receiving portions or on the lower side inside the multiple receiving portions.

6. The pegboard of claim 1, wherein the multiple sensor modules and the multiple light source modules are placed adjacent to each other at the same phase in the vertical direction or stacked in the vertical direction.

7. The pegboard of claim 1, wherein each of the multiple light source modules outputs light of a specific color, and the multiple pegs having various sizes or colors include respective magnets different from each other in magnetism.

8. A rehabilitation training system, comprising: a mobile device; and a pegboard of claim 1 configured to determine a training mode between the pegboard and the mobile device, wherein the pegboard changes at least one of a time point of light output from multiple light source modules, a light output duration, and the number of light source modules that output light simultaneously depending on the training mode.

9. A rehabilitation training method using a pegboard including:
a main device including multiple unit modules and a controller,
a board plate including multiple receiving portions,
wherein the board plate is replaceably coupled to the main device, wherein the main device further includes a sensing unit configured to sense the board plate and identify a type of the board plate based on a pattern of magnets in the board plate, and multiple pegs to be inserted into the multiple receiving portions, the method comprising: setting a training mode of the pegboard by the controller; outputting light from multiple light source modules toward the multiple receiving portions according to the training mode; identifying a receiving portion that outputs light among the multiple receiving portions and inserting at least some of the multiple pegs into at least some of the multiple receiving portions by a user; sensing whether the multiple pegs are inserted into the multiple receiving portions, by multiple sensor modules; and calculating a training result based on sensing data received from the multiple sensor modules, by the controller.

* * * * *